(No Model.) 2 Sheets—Sheet 1.
L. EPSTEIN.
SECONDARY BATTERY.
No. 383,216. Patented May 22, 1888.
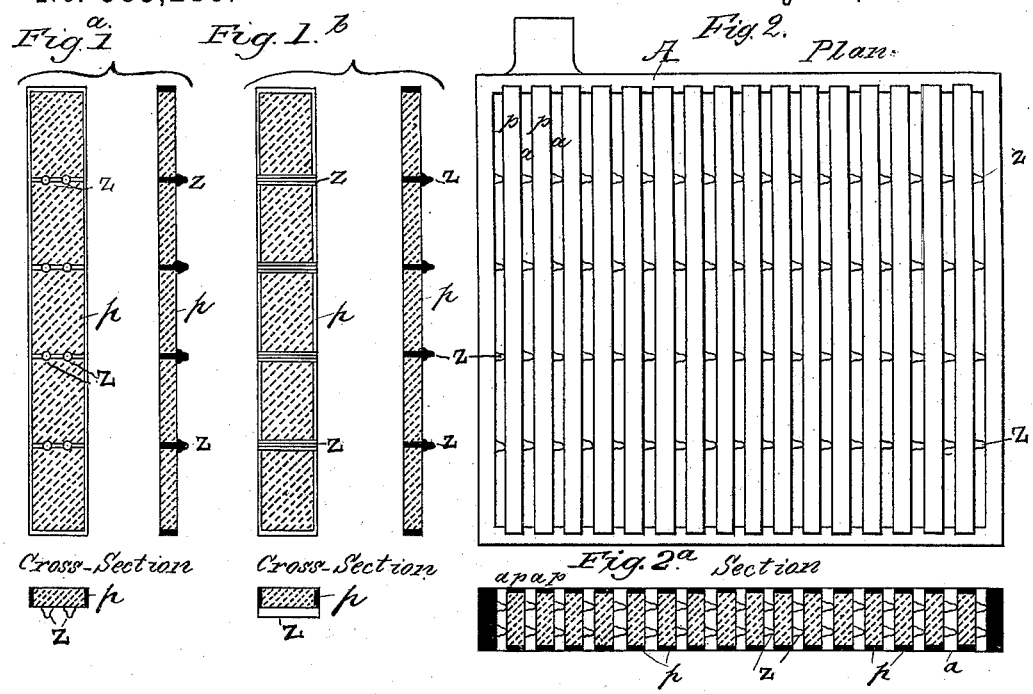
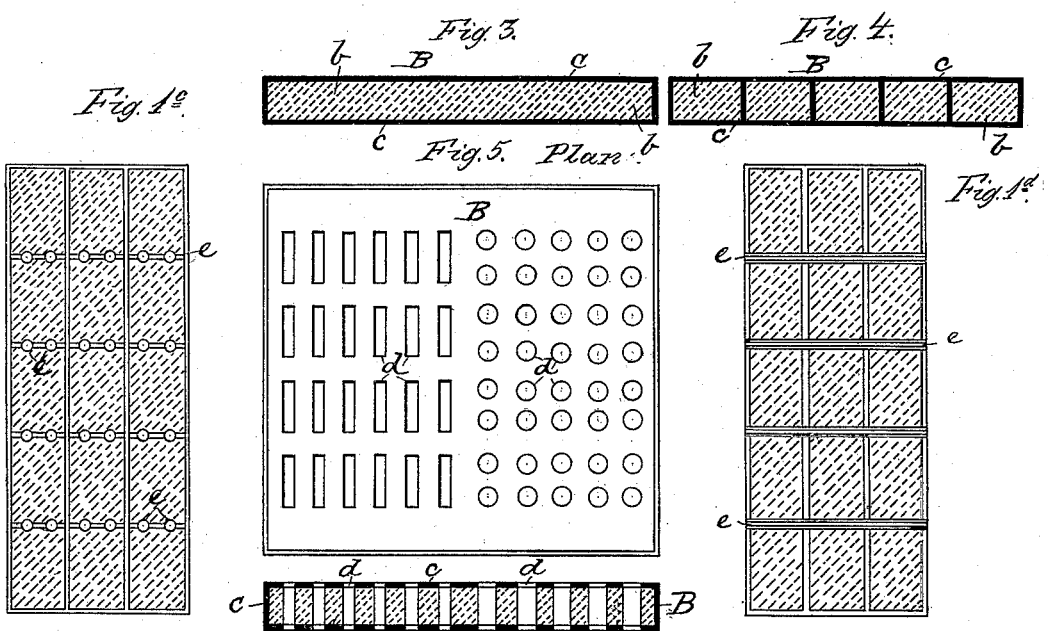
Witnesses:
Donn Twitchell
C. Sedgwick
Inventor:
L. Epstein
By Munn & Co.
Attorneys.
N. PETERS, Photo-Lithographer, Washington, D. C.

(No Model.) 2 Sheets—Sheet 2.
L. EPSTEIN.
SECONDARY BATTERY.
No. 383,216. Patented May 22, 1888.
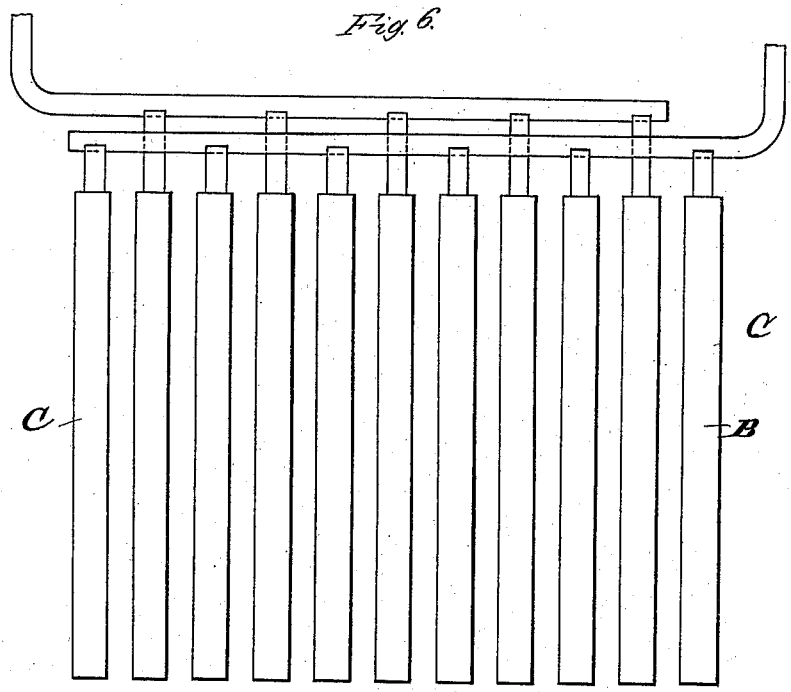
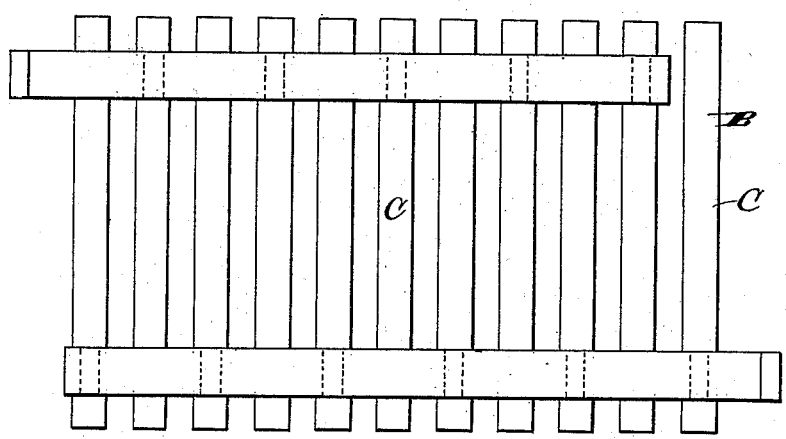

UNITED STATES PATENT OFFICE.

LUDWIG EPSTEIN, OF MARTINIKENFELDE, NEAR BERLIN, PRUSSIA, GERMANY.

SECONDARY BATTERY.

SPECIFICATION forming part of Letters Patent No. 383,216, dated May 22, 1888.

Application filed February 21, 1887. Serial No. 228,336. (No model.)

*To all whom it may concern:*

Be it known that I, LUDWIG EPSTEIN, a subject of the Emperor of Austria, residing at Martinikenfelde, near Berlin, in the Kingdom of Prussia, Germany, have invented new and useful Improvements in Secondary Batteries, of which the following is a specification.

In order to obtain a large active surface, allowing strong currents for charge or discharge, it was up to the present necessary to have in a battery-cell a large number of electrodes. As a rule these electrodes were placed in short distances from each other to keep the internal resistance of the cell as low as possible generally or from want of space in particular. The danger consequent upon this arrangement is, that such cells get rather frequently short circuited partly by the dropping out of active material, partly by the buckling and warping of the plates, whereby the efficacy and practicability of such cells are materially impaired and frequent testing and examining rendered necessary.

Figure $1^a$ is a plan view and a vertical and cross section of one of the strips. Fig. $1^b$ is a plan view and a vertical and cross section of a modification of the same. Fig. 2 is a plan view of the electrode. Fig. $2^a$ is a cross-section of the same. Figs. 3 and 4 are sections of modifications of the electrodes and before they are perforated. Fig. 5 is a plan view of the electrode shown in Fig. 3 and after it has been perforated. Fig. $5^a$ is a cross-section of the same. Figs $1^c$ and $1^d$ are plan and section views, respectively, of another modification; and Figs. 6 and 7 are plan and top views, respectively, of a cell.

My invention has for its object to overcome these difficulties and produce accumulators which require in this respect only very little attention, if any at all.

To attain the object in view I construct the electrodes in such a manner that adjacent parts of electrodes of different polarity do not contain the active material, which is liable to disintegration or change of shape; but those parts consist of a frame or border made of some suitable conducting or non-conducting material, which is little or not at all acted upon by the electrolyte or the action in the cell.

To produce electrodes answering the above purpose I employ several methods, of which the most important are the following, viz: According to one method, I first produce strips consisting of the active material and a frame or net-work of lead or other suitable conducting material, according to the method described in my specification filed at the same date as this present application, Figs. $1^a$, $1^b$, $1^c$, $1^d$; or such strips may be produced according to any other known method, and may be either solid or perforated, flat or corrugated, or serrated or otherwise prepared to receive or retain the active material, and they may contain the active material in the holes, perforations, &c.; or the same may be applied to the surfaces of the support mechanically, or chemically produced or electrically deposited or directly formed by the Planté or any other similar process. I then arrange a number of such strips in rows in a suitable mold, leaving an adequate space between each row, and run them together by casting, soldering, or any other suitable means. The electrodes thus formed present the appearance of a grid, railing, or Venetian blind. (See Fig. 2.) This construction allows a free circulation of the electrolyte, affords a large active surface, and gives the electrodes great mechanical strength. I generally keep the spaces $a$ between the strips $p$ of the electrode A smaller than the said strips $p$ in order to retain in its own electrode any material that may have become detached, thereby preventing such material from overbridging the space between opposite electrodes, and thus short-circuiting the cell. To maintain the interstices between the strips, these latter may be provided with teeth or other protrusions, $z$; or instead thereof strips made of some suitable material may be inserted between them.

Another method to produce such electrodes is the following, viz: I first produce a plate or cake, $b$, of finely-divided lead compound. This plate or cake is placed in a mold, and a frame or cover of lead or some other suitable conducting material, $c$, is cast round it, preferably, completely enveloping it, as shown in Fig. 3. The plate or cake $b$ may be perforated before putting it into the mold, in order that the metal on running it in may enter and fill the perforations, as shown in Fig. 4, thus strengthening the metallic envelope and rendering it more adhesive, Fig. 4. This new plate B, consisting of the cake of active material inside and the metallic frame outside, is now placed under a circular saw, a shaping or boring or perforating machine, and by this or any other suitable appliance slits or holes $d$ are cut or bored right through it, as shown in Fig. 5.

According to another method I take the cake made of the finely-divided lead compound and provide it with slits, holes, or perforations. These slits, holes, or perforations are now filled up with molten metallic lead or some other suitable conducting material, $e$, as shown in Figs. $1^c$ and $1^d$. The outsides of the plate are now covered with some material which adheres firmly to the plate and which may be non-conducting. For instance, I place the plate or cake in a bath of Chattertan compound, or any glue or varnish not easily attacked by the acid in the cell, or I prepare a compound of stearine and beeswax or any other suitable material, or I put these materials on the plate by means of a painter's brush or any other suitable means. This new plate, consisting of active material and metallic lead inside and the adhesive covering outside, is now treated in a circular saw or a boring or perforating machine in the manner as before described.

Any desired number of electrodes produced by any of these methods may now be united to groups and formed in the usual way. Figs. 6 and 7 show such a cell, C. It is evident that such a cell possesses, notwithstanding its limited number of electrodes, a comparative large capacity; that strong charging or discharging currents may be employed; that the more robust character guarantees a longer life-time as compared with the ordinary thin plates; that they stand the wear and tear of moving about much better, and that a dropping out of active material cannot take place in the space be-between electrodes of opposite sign.

Having now particularly described the nature of my said invention and in what manner the same may be performed, I declare that what I claim is—

1. An improved electrode for secondary batteries, the same consisting of a series of composite strips formed of the active material and metallic lead, as specified, the said strips being arranged at a suitable distance apart and connected by suitable means to form a grid, which is adapted to permit the free circulation of the electrolyte, as described.

2. An improved electrode for secondary batteries, the same consisting of a series of strips formed of the active material and metallic lead, suitably connected to form a grid, each such strip having lateral projections $z$, which serve to space it from its neighbor, as shown and described.

3. The improved electrode for secondary batteries hereinbefore described, the same being formed of a rigidly-connected series of cakes or plates composed of a foraminous body of active material and a filling of metallic lead, such composite electrode having a suitable non-conducting covering, such as varnish, as specified.

In testimony whereof I have signed my name to this specification in the presence of two subscribing witnesses.

LUDWIG EPSTEIN.

Witnesses:
  B. ROI,
  LEO STRIMES.